United States Patent
Kanumuri et al.

(10) Patent No.: US 10,742,866 B2
(45) Date of Patent: Aug. 11, 2020

(54) UNIVERSAL SERIAL BUS (USB) VIDEO EXTENSION

(71) Applicant: Microsoft Licensing Technology, LLC, Redmond, WA (US)

(72) Inventors: Sandeep Kanumuri, Redmond, WA (US); Naveen Thumpudi, Redmond, WA (US); Sang Choe, Redmond, WA (US); Sathyanarayanan Karivaradaswamy, Sammamish, WA (US); Joel Corley, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 110 days.

(21) Appl. No.: 15/456,265

(22) Filed: Mar. 10, 2017

(65) Prior Publication Data
US 2018/0097986 A1    Apr. 5, 2018

Related U.S. Application Data

(60) Provisional application No. 62/402,820, filed on Sep. 30, 2016.

(51) Int. Cl.
*H04N 5/232* (2006.01)
*G06F 3/00* (2006.01)
(Continued)

(52) U.S. Cl.
CPC ......... *H04N 5/23206* (2013.01); *G06F 3/005* (2013.01); *H04N 5/77* (2013.01); *H04N 9/8205* (2013.01); *H04N 21/43632* (2013.01)

(58) Field of Classification Search
CPC ......... H04N 5/23206; H04N 21/43632; H04N 5/77; H04N 9/8205; G06F 3/005
See application file for complete search history.

(56) References Cited

U.S. PATENT DOCUMENTS 7,024,051 B2   4/2006   Miller et al.
7,148,923 B2   12/2006  Harper et al.
(Continued)

OTHER PUBLICATIONS

Active USB User Guide (Year: 2017).*
(Continued)

*Primary Examiner* — Twyler L Haskins
*Assistant Examiner* — Angel L Garces-Rivera
(74) *Attorney, Agent, or Firm* — Arent Fox, LLP

(57) ABSTRACT

Methods and devices for enabling controls of an imaging device may include receiving a data stream with a request for at least one control of an imaging device, wherein the at least one control is related to Universal Serial Bus (USB) video. The methods and devices may include identifying a defined functionality of the at least one control and transmitting the data stream to the imaging device to specify the operation of the imaging device based on the defined functionality of the at least one control. The methods and devices may also include generating metadata information from received video frame packets from an imaging device. The methods and devices may include identifying metadata information in the header of a video packet when the header size exceeds the standard header size. The methods and devices may include generating a metadata buffer with the identified metadata information.

23 Claims, 8 Drawing Sheets

(51) Int. Cl.
*H04N 9/82* (2006.01)
*H04N 5/77* (2006.01)
*H04N 21/4363* (2011.01)

(56) References Cited

U.S. PATENT DOCUMENTS

| | | |
|---|---|---|
| RE40,865 E | 8/2009 | Anderson |
| 7,676,752 B2 | 3/2010 | Bhesania et al. |
| 8,638,373 B2 | 1/2014 | Niikura |
| 8,648,843 B2 | 2/2014 | Thompson et al. |
| 2007/0260762 A1 | 11/2007 | Miyamoto |
| 2010/0188585 A1 | 7/2010 | Ichieda |
| 2014/0372882 A1 | 12/2014 | Broadbent, III et al. |
| 2016/0295093 A1* | 10/2016 | Yokomizo ........... G06F 3/04842 |

OTHER PUBLICATIONS

"Using Point Grey USB3 Vision Cameras with A&B Software's ActiveUSB", http://web.archive.org/web/20150226213920/http://www.ptgrey.com/tan/10335, Published on: Feb. 26, 2015, 8 pages.
"USB Video Class Device", http://www.xmos.com/download/private/AN00127%3A-USB-Video-Class-Device%282.0.2rc1%29.pdf, Retrieved on: Nov. 7, 2016, 33 pages.

* cited by examiner

UNIVERSAL SERIAL BUS (USB) VIDEO EXTENSION

RELATED APPLICATION

This application claims priority to U.S. Application No. 62/402,820 titled "Universal Serial Bus (USB) Video Extension," filed Sep. 30, 2016, which is incorporated herein by reference in its entirety.

BACKGROUND

The present disclosure relates to a computer device, and more particularly, to a computer device configured for processing image data captured by an imaging device.

The Universal Serial Bus (USB) Video Class specification provides guidelines and protocols to implement video streaming hardware. Currently, the USB Video Class specification provides basic controls for imaging devices.

Thus, improvements in the Universal Serial Bus (USB) Video Class specification may be desired.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and an operating system in communication with the memory and processor. The operating system may be operable to receive a data stream with a request for at least one control of an imaging device, wherein the at least one control is related to Universal Serial Bus (USB) video and is selected from one or more of focus control, exposure control, exposure compensation (EV) control, white balance control, face authentication control, camera extrinsics control, camera intrinsics control, ISO control, and metadata control, identify a defined functionality of the at least one control, and transmit the data stream to the imaging device to specify the operation of the imaging device based on the defined functionality of the at least one control.

Another example implementation relates to a method for enabling controls of an imaging device. The method may include receiving a data stream with a request for at least one control of an imaging device, wherein the at least one control is related to Universal Serial Bus (USB) video and is selected from one or more of focus control, exposure control, exposure compensation (EV) control, white balance control, face authentication control, camera extrinsics control, camera intrinsics control, ISO control, and metadata control. The method may also include identifying a defined functionality of the at least one control. In addition, the method may include transmitting the data stream to the imaging device to specify the operation of the imaging device based on the defined functionality of the at least one control.

Another example implementation relates to computer-readable medium storing instructions executable by a computer device. The computer-readable medium may include at least one instruction for causing the computer device to receive a data stream with a request for at least one control of an imaging device, wherein the at least one control is related to Universal Serial Bus (USB) video and is selected from one or more of focus control, exposure control, exposure compensation (EV) control, white balance control, face authentication control, camera extrinsics control, camera intrinsics control, ISO control, and metadata control. The computer-readable medium may include at least one instruction for causing the computer device to identify a defined functionality of the at least one control. The computer-readable medium may include at least one instruction for causing the computer device to transmit the data stream to the imaging device to specify the operation of the imaging device based on the defined functionality of the at least one control.

One example implementation relates to a computer device. The computer device may include a memory to store data and instructions, a processor in communication with the memory, and an operating system in communication with the memory and processor. The operating system may be operable to receive a plurality of video frame packets including a header and video frame data from an imaging device, determine whether a header size of each video packet header exceeds a standard header size, identify metadata information in the header when the header size exceeds the standard header size, generate a metadata buffer with the metadata information received from the video frame packets, wherein the metadata buffer includes a defined format including a payload and a metadata buffer header with a metadata identifier and a size value, and transmit the metadata buffer to an application.

Another example implementation relates to a method for generating metadata information. The method may include receiving, at an operating system executing on the computer device, a plurality of video frame packets including a header and video frame data from an imaging device. The method may also include determining whether a header size of each video packet header exceeds a standard header size. The method may include identifying metadata information in the header when the header size exceeds the standard header size. The method may also include generating a metadata buffer with the metadata information received from the video frame packets, wherein the metadata buffer includes a defined format including a payload and a metadata buffer header with a metadata identifier and a size value. The method may include transmitting the metadata buffer to an application.

Another example implementation relates to computer-readable medium storing instructions executable by a computer device. The computer-readable medium may include at least one instruction for causing the computer device to receive a plurality of video frame packets including a header and video frame data from an imaging device. The computer-readable medium may include at least one instruction for causing the computer device to determine whether a header size of each video packet header exceeds a standard header size, identify metadata information in the header when the header size exceeds the standard header size. The computer-readable medium may include at least one instruction for causing the computer device to generate a metadata buffer with the metadata information received from the video frame packets, wherein the metadata buffer includes a defined format including a payload and a metadata buffer header with a metadata identifier and a size value. The computer-readable medium may include at least one instruction for causing the computer device to transmit the metadata buffer to an application.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides an extension to the Universal Serial Bus (USB) Video Class specification that enables new controls as well as the capability to carry well-defined frame-metadata in a standard format. In addition, the present disclosure provides advance controls and a standardized format for defining such controls for imaging devices. The present disclosure also provides cancelable controls, e.g., the ability to set or turn on a particular control function and to cancel or turn off the particular control function. For example, the present disclosure may provide the ability to cancel long running controls, such as, focus and may provide granular steps for exposure (EV) compensation. As such, the present disclosure may provide an application executing on a computer device with additional functionality and control over one or more imaging devices, which may improve performance and/or improve the user experience.

Figure 1:
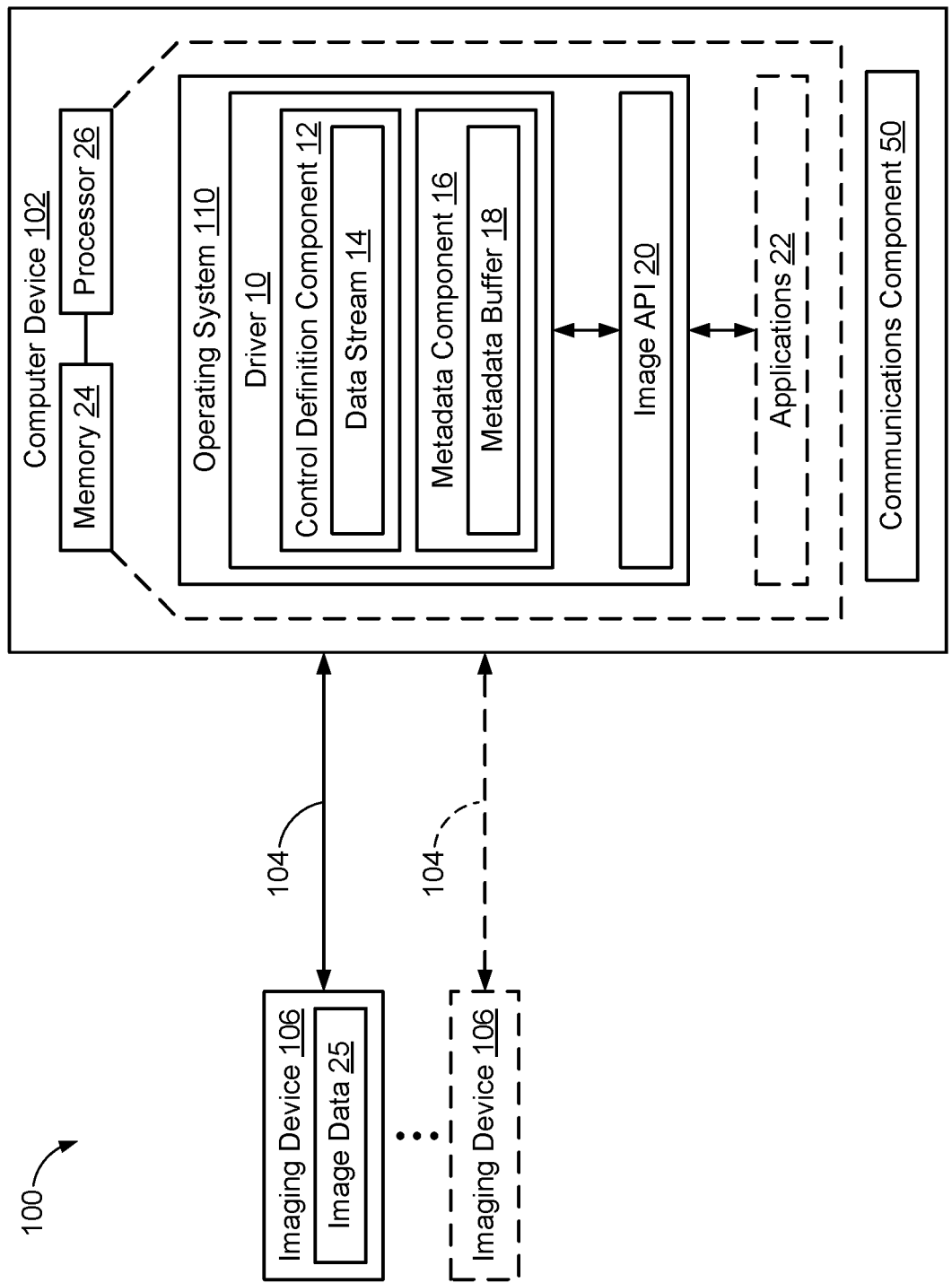
FIG. 1 is a schematic block diagram of an example device in accordance with an implementation of the present disclosure.

Referring now to FIG. 1, an example system 100 for capturing and processing image data 25 may include one or more imaging devices 106 in communication with computer device 102, such as via a communication link 104 with a communication component 50. Imaging device 106 may capture and transmit image data 25 of a scene to computer device 102, including a stream of image data 25 that may define a video. Imaging device 106 may include any device that may be used to capture and/or manipulate video and video-related functionality, such as, but not limited to, desktop video cameras (webcams), digital camcorders, analog video converters, analog and digital television tuners, and still image cameras that support video streaming. Example imaging devices 106 may include a red green blue (RGB) camera, an infrared (IR) camera, or a depth camera, or any other type of device having a sensor associated with acquiring image data. Further, for example, imaging device 106 may be any USB video device as defined by the Universal Serial Bus Device Class Definition for Video Devices specification published by the USB Implementers Forum, Inc. The communication link 104 may be a cable having a Universal Serial Bus (USB) connector, and the communication component 50 may include one or more USB IN endpoints on a USB interface to which the USB connector may be communicatively coupled.

Computer device 102 in accordance with the present disclosure may include an operating system 110 executed by processor 26 and/or memory 24, and including a driver 10 for communicating with one or more imaging devices 106 and/or one or more applications 22. Memory 24 may be configured for storing data and/or computer-executable instructions defining and/or associated with operating system 110, and processor 26 may execute operating system 110. An example of memory 24 can include, but is not limited to, a type of memory usable by a computer, such as random access memory (RAM), read only memory (ROM), tapes, magnetic discs, optical discs, volatile memory, non-volatile memory, and any combination thereof. An example of processor 26 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be able to communicate via a wired connection and/or wirelessly with one or more communications networks, such as but not limited to the Internet. Computer device 102 may be, for example, a computer device such as a desktop or laptop or tablet computer, a cellular telephone, a gaming device, a music device, a television, a navigation system, a camera, a personal digital assistant (PDA), or a handheld device, or any other computer device having wired and/or wireless connection capability with one or more other devices.

Driver 10 may be a class-specific driver, such as a USB video device class device driver. Driver 10 may receive image data 25 and may process the received image data 25. Driver 10 may include a control definition component 12 that may define one or more controls for imaging device 106 and/or image data 25. For example, control definition component 12 may generate a data stream 14 defining one or more controls for image data 25 and/or imaging device 106. Controls may include, but are not limited to, focus control, exposure control, exposure (EV) compensation control, white balance control, face authentication control, camera extrinsics control, camera intrinsics control, cancelable controls, ISO control, and metadata control.

In addition, driver 10 may communicate with one or more applications 22 via image application programming interface (API) 20. For example, driver 10 may transmit data stream 14 to image API 20 so that application 22 may receive image data 25 along with any additional control information provided by data stream 14. In addition, driver 10 may receive communications from application 22 regarding the received image data 25 and/or imaging device 106. For example, application 22 may want to modify the exposure of imaging device 106. Application 22 may send a communication to driver 10 via image API 20 indicating that application 22 wants to lock the current exposure of imaging device 106. Driver 10 may generate data stream 14 with the exposure lock mode control enabled and transmit data stream 14 to imaging device 106. Imaging device 106 may lock the current exposure in response to receiving data stream 14.

According to the present disclosure, new controls such as a lock mode and asynchronous functionality may be added to the existing control functions as defined by the Universal Serial Bus (USB) Video Class specification. Additionally, the present disclosure provides the capability to carry well-defined frame-metadata in a standard format.

In an implementation, the new controls may be enabled through an extension unit identified by GUID MS_CAMERA_CONTROL_XU also referred throughout as "MSXU." An example is illustrated below
// {0F395DC-2632-4C4E-92C9-A04782F43BC8}
DEFINE_GUID(MS_CAMERA_CONTROL_XU,
   0xf3f95dc, 0x2632, 0x4c4e, 0x92, 0xc9, 0xa0, 0x47, 0x82, 0xf4, 0x3b, 0xc8);

The extension unit may be implemented by firmware on imaging device 106, thereby avoiding the need for specialized software. In addition, the firmware of the imaging device 106 may house the new controls defined in the following description.

Figure 2:
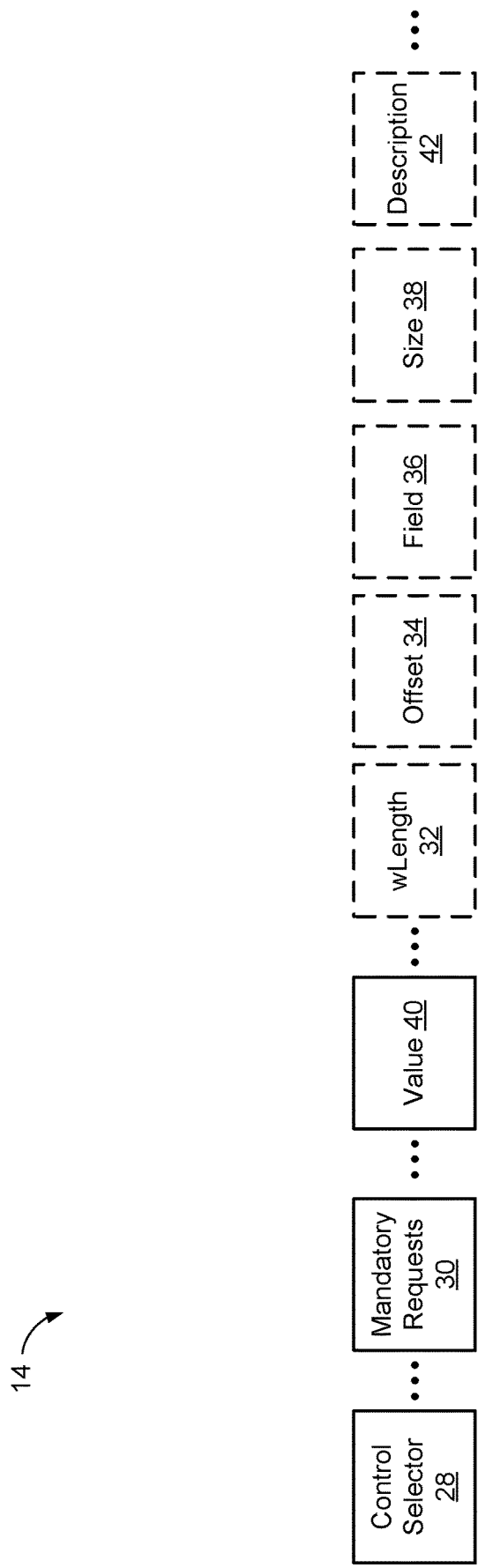
FIG. 2 is an example data stream in accordance with an implementation of the present disclosure.

Referring now to FIG. 2, illustrated therein is an example implementation of data stream 14. Data stream 14 may include a control selector 28 that identifies a control being requested by one or more applications 22 (FIG. 1). In addition, data stream 14 may include a control selector 28 that identifies a control being requested by one or more imaging devices 106. Example controls include, but are not limited to, focus control, exposure control, EV compensation control, white balance control, face authentication control, camera extrinsics control, camera intrinsics control, cancelable controls, ISO control, and metadata control. As described herein, each control identified by each control selector 28 may have a standardized set of fields and/or data used to define the characteristics and/or parameters associated with each control. In addition, some controls that are asynchronous in nature may require completion of a status interrupt.

Each control may have a set of mandatory requests 30 and optional requests. Example requests may include, but are not limited to, GET_INFO, GET_LEN, GET_RES, GET_MIN, GET_MAX, GET_DEF, GET_CUR, and SET_CUR. The following request definitions may apply to all the controls, unless an overriding definition is specified explicitly for a specified control. For example, a GET_INFO request may report support capabilities for GET_xxx and SET_xxx requests through D0 and D1 bits for each control appropriately based on the mandatory and optional requests for that control; further, unless explicitly specified otherwise at each control level, by default, a GET_INFO request may report the control without AutoUpdate and Asynchronous capabilities (i.e., D3 and D4 bits shall be set to 0). For example, the "UVC 1.5 Class specification.pdf" may provide additional information for definitions of D0, D1, D3, D4 and other bits present in GET_INFO request. A GET_LEN request may report a maximum length of the payload for a control (i.e., wLength). A GET_RES request may report a resolution (i.e., step-size) for qwValue/dwValue and with the remaining fields set to 0. A GET_MIN request may report the minimum supported value for qwValue/dwValue with the remaining fields set to 0. A GET_MAX request may report a maximum supported value for qwValue/dwValue. In addition, in bmControlFlags, supported fields are set to 1, with the other fields set to 0. The GET_DEF and GET_CUR requests may report a default and current settings, respectively, for fields qwValue/dwValue and bmControlFlags, with the remaining fields set to 0. A SET_CUR request may be issued by applications 22 after setting at least one or all fields.

An example implementation of mapping various control selectors 28 to a respective value and a bit position for the bmControls field in Extension Unit Descriptor is illustrated in the below table.

| Control Selector | Value | Bit Position (bmControls Field) |
| --- | --- | --- |
| MSXU_CONTROL_UNDEFINED | 0x00 | NA |
| MSXU_CONTROL_FOCUS | 0x01 | D0 |
| MSXU_CONTROL_EXPOSURE | 0x02 | D1 |
| MSXU_CONTROL_EVCOMPENSATION | 0x03 | D2 |
| MSXU_CONTROL_WHITEBALANCE | 0x04 | D3 |
| MSXU_ISO_CONTROL | 0x05 | D4 |
| MSXU_CONTROL_FACE_AUTHENTICATION | 0x06 | D5 |
| MSXU_CONTROL_CAMERA_EXTRINSICS | 0x07 | D6 |
| MSXU_CONTROL_CAMERA_INTRINSICS | 0x08 | D7 |
| MSXU_CONTROL_METADATA | 0x09 | D8 |

While the above controls are optional, some controls may be implemented together. For example, a face authentication control and metadata control may be implemented together in order to perform face authentication. In addition, when frame illumination mode is enabled, the metadata frame may include frame illumination information.

When working with three dimensional (3D) scenarios, such as, but not limited to, mapping pixels from one camera view into another camera view, a camera extrinsics control, a camera intrinsics control, and a metadata control may be implemented. In addition, the metadata frame may include camera extrinsics and camera intrinsics information.

Data stream 14 may optionally include other fields. For example, data stream may optionally include wLength 32 which may indicate a maximum length of a payload for a control. Data stream 14 may optionally include any one or more of offset 34, field 36, size 38, and description 42. Moreover, data stream 14 may include other data fields related to USB camera operations interspaced between any of control selector 28, mandatory requests 30, and value 40. In addition, if data stream includes any of wLength 32, offset 34, field 36, size 38, and description 42, other data fields related to USB camera operations may be interspaced between the selected fields. Moreover, the fields may be in any order in data stream 14 and may change for different requests sent and/or received.

One type of control may include a cancelable control. The cancelable control may leverage an Autoupdate capability. For example, the GET_INFO request may report such control as an Autoupdate Control (i.e., D3 bit shall be set to 1) but not as an Asynchronous control (i.e., D4 bit shall be set to 0).

For a cancelable control, a SET_CUR request may be issued to set a new value (i.e., a SET_CUR(NORMAL) request where a bmOperationFlags:D0 bit is set to 0) or cancel a previous SET_CUR(NORMAL) request (i.e., a SET_CUR(CANCEL) request where a bmOperationFlags:D0 bit is set to 1). A SET_CUR request may be completed by the device as soon as the request is received (even though the hardware is not configured or converged to the new settings requested). For each SET_CUR(NORMAL) request, the device produces a corresponding Control Change interrupt for this control which is raised when the new settings have been applied or when a SET_CUR (CANCEL) request arrives; until this interrupt arrives, the SET_CUR(NORMAL) request is considered to be in-progress. When a SET_CUR(NORMAL) request is in-progress, additional SET_CUR(NORMAL) requests for this particular control results in a failure. A SET_CUR(CANCEL) request will succeed. If there is nothing to cancel, then the device does nothing.

The Control Change interrupt's payload has the bit bmOperationFlags:D0 set to 0 if the settings specified by SET_CUR(NORMAL) were applied (i.e., convergence happened) and set to 1 if the settings were not applied because of a SET_CUR(CANCEL) request that came after the SET_CUR(NORMAL) request (i.e., convergence has not happened yet).

One implementation may include a control selector 28 for a focus control. Focus control may allow applications 22 to specify the focus settings for imaging device 106. Focus control may be a global control that affects all endpoints on all video streaming interfaces associated with a video control interface and may be mapped to KSPROPERTY_CAMERACONTROL_EXTENDED_FOCUSMODE by camera driver 10. An example implementation of a format of value 40 in data stream 14 for focus control is illustrated in the below table.

| Control Selector | MSXU_CONTROL_FOCUS |
| --- | --- |
| Mandatory Requests | GET_INFO, GET_LEN, GET_RES, GET_MIN, GET_MAX, GET_DEF, GET_CUR, SET_CUR |
| wLength | 12 |

| Offset | Field | Size | Value | Description |
| --- | --- | --- | --- | --- |
| 0 | bmOperationFlags | 1 | Bitmap | D0: Cancelation<br>D1-D7: Reserved, set to zero |
| 1 | bmControlFlags | 7 | Bitmap | D0: Auto Mode. This mode indicates auto focus and the completion interrupt is triggered when the auto focus operation has converged. Upon completion, and when this mode is not combined with D2 mode, the focus may diverge and the camera will continue to attempt convergence. This behaves as if switched to D8 mode after the initial convergence. If the D2 mode is included, the focus is locked to the first convergence and does not change until a new focus command is received.<br>D1: Manual Mode. This indicates a manual mode where specific focus setting is provided through dwValue.<br>D2: Lock Mode. When this mode is set without a corresponding D0 mode, the camera is expected to lock the current focus state and trigger the completion interrupt once the focus is locked. Camera must not vary the focus state until a new focus command is received. If D0 mode is combined with this mode, the camera will converge on auto-focus and lock the focus to that converged point and then trigger the completion interrupt. Locking the focus without combining Auto mode when the focus is already locked should be treated as no-op and the completion interrupt should be triggered immediately. Locking the focus in combination with Auto mode when the focus is already locked should trigger a new convergence and a completion interrupt.<br>D3-D7: Reserved, set to zero<br>D8: Continuous Mode. This mode indicates that the focus is continuous. There is no single convergence point for focus control in this case. The camera must accept this request and trigger the completion interrupt immediately.<br>D9-D15: Reserved, set to zero<br>D16: Macro range. This indicates that focus convergence should be performed for the macro range.<br>D17: Normal range. This indicates that focus convergence should be performed for the normal range.<br>D18: Full range. This indicates that focus convergence should be performed for the full range.<br>D19: Infinity range. This indicates that focus convergence should be performed for the infinity range.<br>D20: Hyperfocal range. This indicates that focus convergence should be performed for the hyperfocal range.<br>D21-D55: Reserved, set to zero |
| 8 | dwValue | 4 | Number | Focus value. |

Focus control may function as a cancelable control.

Example mandatory requests for focus control may include a GET_MAX request that advertises support for bits D0, D1, D2, D8 and D18 in bmControlFlags. In addition, a GET_DEF request may indicate that the default value for bmControlFlags is D0 and D18 set to 1 and a default value for dwValue is set to 0. The GET_CUR and SET_CUR requests, may include the following restrictions for field bmControlFlags: among D0, D1 and D8 bits, only one bit can be set; none of them being set is valid too if D2 bit is set; among D16, D17, D18, D19 and D20 bits, only one bit can be set; none of them being set is valid too; D1 bit is incompatible with all other bits currently defined (D0, D2, D8, D16, D17, D18, D19 and D20); and D2 bit is incompatible with D1 and D8; and D2 bit is incompatible with D16, D17, D18, D19 and D20 if D0 is not set.

Another implementation may include a control selector 28 for an exposure control. Exposure control may allow applications 22 to specify exposure settings for imaging device 106. Exposure control may be a global control that affects all endpoints on all video streaming interfaces associated with a video control interface and may be mapped to KSPROPERTY_CAMERACONTROL_EXTENDED_EXPOSUREMODE by camera driver 10. An example implementation of a format of value 40 in data stream 14 for exposure control is illustrated in the below table.

| Control Selector | MSXU_CONTROL_EXPOSURE |
|---|---|
| Mandatory Requests | GET_INFO, GET_LEN, GET_RES, GET_MIN, GET_MAX, GET_DEF, GET_CUR, SET_CUR |
| wLength | 15 |

| Offset | Field | Size | Value | Description |
|---|---|---|---|---|
| 0 | bmControlFlags | 7 | Bitmap | D0: Auto Mode. This mode indicates auto exposure and the completion interrupt is triggered when the auto exposure operation has converged. Upon completion, and when this mode is not combined with D2 mode, the exposure may diverge and the camera will continue to attempt convergence. If the D2 mode is included, the exposure is locked to the first convergence and does not change until a new exposure command is received. D1: Manual Mode. This indicates a manual mode where specific exposure setting is provided through qwValue. D2: Lock Mode. When this mode is set without a corresponding D0 mode, the camera is expected to lock the current exposure state and trigger the completion interrupt once the exposure is locked. Camera must not vary the exposure state until a new exposure command is received. If D0 mode is combined with this mode, the camera will converge on auto-exposure and lock the exposure to that converged point and then trigger the completion interrupt. Locking the exposure without combining Auto mode when the exposure is already locked should be treated as no-op and the completion interrupt should be triggered immediately. Locking the exposure in combination with Auto mode when the exposure is already locked should trigger a new convergence and a completion interrupt. D3-D55: Reserved, set to zero |
| 7 | qwValue | 8 | Number | Exposure time in 100 nanosecond units. The semantic meaning of exposure time is the same as that in UVC1.5 spec (just the units are different). |

Example mandatory requests for exposure control may include a GET_INFO request that reports exposure control as an Asynchronous control (i.e., D4 bit shall be set to 1) but not as an AutoUpdate control (i.e., D3 bit shall be set to 0). In addition, a GET_MAX request may advertise support for bits D0, D1 and D2 in bmControlFlags. A GET_DEF may indicate that the default value for bmControlFlags is D0 set to 1 and qwValue set to 0. The GET_CUR and SET_CUR requests, may include the following restrictions for field bmControlFlags: among D0, D1 and D2 bits, at least one bit shall be set; and D1 is incompatible with D0 and D2.

Another implementation may include a control selector 28 for an EV compensation control. EV compensation control may allow applications 22 to specify the EV compensation settings for imaging device 106. EV compensation control may be a global control that affects all endpoints on all video streaming interfaces associated with a video control interface. EV compensation control may be mapped to KSPROPERTY_CAMERACONTROL_EXTENDED_EVCOMPENSATION by the camera driver 14. An example implementation of a format of value 40 in data stream 14 for EV compensation control is illustrated in the below table.

| Control Selector | MSXU_CONTROL_EVCOMPENSATION |
| --- | --- |
| Mandatory Requests | GET_INFO, GET_LEN, GET_RES, GET_MIN, GET_MAX, GET_DEF, GET_CUR, SET_CUR |
| wLength | 11 |

| Offset | Field | Size | Value | Description |
| --- | --- | --- | --- | --- |
| 0 | bmControlFlags | 7 | Bitmap | D0: EV compensation step-size of $1/8$.<br>D1: EV compensation step-size of $1/4$.<br>D2: EV compensation step-size of $1/3$.<br>D3: EV compensation step-size of $1/2$.<br>D4: EV compensation step-size of 1.<br>D5-D55: Reserved, set to zero |
| 7 | dwValue | 4 | Number | Signed (positive/negative) EV value in units of step-size specified by bmControlFlags. |

Example mandatory requests for EV compensation control may include a GET_INFO request that reports EV compensation control as an Asynchronous control (i.e. D4 bit is set to 1) but not as an AutoUpdate control (i.e. D3 bit is set to 0). In addition, a GET_RES request reports the supported resolutions (step-size) by setting corresponding bits (at least one bit) in bmControlFlags with the other fields set to 0. The GET_MIN and GET_MAX requests report a minimum and maximum supported value for dwValue with the bit D4 (indicating step-size of 1) as the one and only bit set in bmControlFlags and the remaining fields are set to 0. The GET_DEF, GET_CUR, and SET_CUR requests have one and only one bit set among D0, D1, D2, D3 and D4 bits for field bmControlFlags and the GET_DEF request has dwValue set to 0.

Another implementation may include a control selector 28 for a white balance control. White balance control may allow applications 22 to specify white balance settings for imaging device 106. White balance control may be a global control that affects all endpoints on all video streaming interfaces associated with a video control interface. White balance control may be mapped by the camera driver 14 to KSPROPERTY_CAMERACONTROL_EXTENDED_WHITEBALANCEMODE. An example implementation of a format of value 40 in data stream 14 for white balance control is illustrated in the below table.

| Control Selector | MSXU_CONTROL_WHITEBALANCE |
| --- | --- |
| Mandatory Requests | GET_INFO, GET_LEN, GET_RES, GET_MIN, GET_MAX, GET_DEF, GET_CUR, SET_CUR |
| wLength | 15 |

| Offset | Field | Size | Value | Description |
| --- | --- | --- | --- | --- |
| 0 | bmControlFlags | 7 | Bitmap | D0: Auto Mode. This mode indicates auto white balance and the completion interrupt is triggered when the auto white balance operation has converged. Upon completion, and when this mode is not combined with D2 mode, the white balance may diverge and the camera will continue to attempt convergence. If the D2 mode is included, the white balance is locked to the first convergence and does not change until a new white balance command is received.<br>D1: Manual Mode. This indicates a manual mode where specific white balance setting is provided through dwValueFormat and dwValue.<br>D2: Lock Mode. When this mode is set without a corresponding D0 mode, the camera is expected to lock the current white balance state and trigger the completion interrupt once the white balance is locked. Camera must not vary the white balance state until a new white balance command is received. If D0 mode is combined with this mode, the camera will converge on auto-white balance and lock the white balance to that converged point and then trigger the completion interrupt. Locking the white balance without combining Auto mode when the white balance is already locked should be treated as no-op and the completion interrupt should be triggered immediately. Locking the white balance in combination with Auto mode when the white balance is already locked should trigger a new convergence and a completion interrupt.<br>D3-D55: Reserved, set to zero |

-continued

| | | | | |
|---|---|---|---|---|
| 7 | dwValueFormat | 4 | Number | The format for dwValue field. Valid values are 1 and 2. 0 is used when this field is not applicable. All other values (3-0xFFFFFFFF) are reserved. |
| 11 | dwValue | 4 | Number | When dwValueFormat is 1, this value represents white balance setting as temperature in degrees Kelvin. When dwValueFormat is 2, this value represents white balance setting as one of the presets defined below: 1: Cloudy; preset for cloudy conditions. 2: Daylight; preset for daylight. 3: Flash; preset to compensate for flash lighting. 4: Fluorescent; preset to compensate for fluorescent lighting. 5: Tungsten; preset to compensate for tungsten lighting. 6: Candlelight; preset to compensate for candlelight lighting. |

Example mandatory requests for white balance control may include a GET_INFO request that reports white balance control as an Asynchronous control (i.e. D4 bit shall be set to 1) but not as an AutoUpdate control (i.e. D3 bit shall be set to 0). The GET_RES, GET_MIN, and GET_MAX requests have dwValueFormat set to 1. A GET_MAX request advertises support for bits D0, D1 and D2 in bmControlFlags. A GET_DEF request has a default for bmControlFlags where D0 is set to 1 and where dwValueFormat and dwValue are set to 0. The GET_CUR and SET_CUR requests, may include the following restrictions for field bmControlFlags: among D0, D1 and D2 bits, at least one bit shall be set; and D1 is incompatible with D0 and D2.

Another implementation may include a control selector 28 for an ISO control. ISO control may allow applications 22 to specify the ISO film speed settings for still image capture on imaging device 106. ISO control is only applicable to the specified streaming interfaces (which is a subset of all video streaming interfaces associated with the video control interface). ISO control may affect the still image capture output and may not affect the video capture output. For example, ISO control may not be supported for interfaces using Method 1 for still image capture. In addition, ISO control may be mapped by camera driver 14 to KSPROPERTY_CAMERACONTROL_EXTENDED_ISO_ADVANCED. An example implementation of a format of value 40 in data stream 14 for exposure control is illustrated in the below table.

| Control Selector | | MSXU_ISO_CONTROL | | |
|---|---|---|---|---|
| Mandatory Requests | | GET_INFO, GET_LEN, GET_RES, GET_MIN, GET_MAX, GET_DEF, GET_CUR, SET_CUR | | |
| wLength | | Vendor-Specific | | |
| Offset | Field | Size | Value | Description |
| 0 | bNumEntries | 1 | Number | Number of entries covered: n |
| 1 | bInterfaceNumber(1) | 1 | Number | Number of streaming interface for entry 1. A zero-based value identifying the index in the array of concurrent interfaces supported by this configuration. |
| 2 | bmControlFlags(1) | 7 | Bitmap | D0: Auto mode (KSCAMERA_EXTENDEDPROP_ISO_AUTO) D52: Manual mode (KSCAMERA_EXTENDEDPROP_ISO_MANUAL) |
| 9 | dwValue(1) | 4 | Number | ISO speed value |
| ... | ... | ... | ... | ... |
| 12 * (n − 1) + 1 | bInterfaceNumber(n) | 1 | Number | Number of streaming interface for entry n |
| 12 * (n − 1) + 2 | bmControlFlags(n) | 7 | Bitmap | Same as that of bmControlFlags(1) |
| 12 * (n − 1) + 9 | dwValue(n) | 4 | Number | Same as that of dwValue(1) |

Example mandatory requests for ISO control may include a GET_INFO request that reports the ISO control as an Asynchronous control (i.e., D4 bit shall be set to 1) but not as an AutoUpdate control (i.e., D3 bit shall be set to 0). The GET_RES, GET_MIN, GET_MAX, GET_DEF, and GET_CUR requests may list streaming interfaces capable of either D0 (Auto mode) or D52 (Manual mode). For example, if streaming interface is capable of either D0 or D52, the streaming interface gets listed; otherwise, the streaming interface does not get listed.

Another implementation may include a control selector 28 for a face authentication control. Face authentication control may allow applications 22 to specify whether imaging device 106 supports streaming modes that are used for face authentication. Face authentication control may be supported when imaging device 106 wishes to support face authentication. Face authentication control may be mapped to KSPROPERTY_CAMERACONTROL_EXTENDED_FACEAUTH_MODE by camera driver 14. Face authentication control is applicable to imaging devices 106 that may produce Infra-Red (IR) data and is applicable to specified streaming interfaces (which is a subset of all video streaming interfaces associated with a video control interface). An example implementation of a format of value 40 in data stream 14 for face authentication control is illustrated in the below table.

| Control Selector | MSXU_CONTROL_FACE_AUTHENTICATION | | | |
|---|---|---|---|---|
| Mandatory Requests | GET_INFO, GET_LEN, GET_RES, GET_MIN, GET_MAX, GET_DEF, GET_CUR, SET_CUR | | | |
| wLength | Vendor-Specific | | | |

| Offset | Field | Size | Value | Description |
|---|---|---|---|---|
| 0 | bNumEntries | 1 | Number | Number of entries listed: n |
| 1 | bInterfaceNumber(1) | 1 | Number | Video Streaming Interface number for entry 1. A zero-based value identifying the index in the array of concurrent interfaces supported by this configuration. |
| 2 | bmControlFlags(1) | 7 | Bitmap | D0: Authentication Disabled; this indicates that the camera is not being used for face authentication. D1: Authentication Alternative Frame Illumination; this indicates that the camera is being used for face authentication and the illumination strobe is expected to alternate between on and off for each video frame captured. When this is set to 1, the frame-metadata on each video frame shall inform about the illumination status of that frame using MetadataId_FrameIllumination. D2: Authentication Background Subtraction; this indicates that the camera is being used for face authentication and the video frame is expected to be created with background ambient light subtracted. D3-D55: Reserved, set to zero |
| ... | ... | ... | ... | ... |
| 8 * (n − 1) + 1 | bInterfaceNumber(n) | 1 | Number | Video Streaming Interface number for entry n |
| 8 * (n − 1) + 2 | bmControlFlags(n) | 7 | Bitmap | Same as that of bmControlFlags(1) |

Example mandatory requests for face authentication control may include GET_RES and GET_MIN requests that report field bNumEntries set to 0 and hence have no additional fields. For a GET_MAX request, a bit set to 1 on the bmControlFlags field indicates that the corresponding mode is supported for a specific streaming interface. A GET_MAX request output lists streaming interfaces capable of either D1 or D2 (i.e., if streaming interface is capable of either D1 or D2, the streaming interface is listed; otherwise, the streaming interface is not included in the list). Also, streaming interfaces are not advertised to be capable of both D1 and D2. If a streaming interface is expected to work in a general purpose manner (i.e., outside of the purpose of face authentication), then D0 is set to 1 for that streaming interface (in addition to D1/D2).

For the GET_DEF, GET_CUR, and SET_CUR requests, a bit set to 1 on the bmControlFlags field indicates that a corresponding mode is chosen for that streaming interface. In the GET_DEF, GET_CUR, and SET_CUR requests, only one bit (among D0, D1 & D2) is set for a particular streaming interface. For the GET_DEF request that returns a default choice (which may be implementation specific), if a streaming interface is expected to work in a general purpose manner (i.e., outside of the purpose of face authentication), then D0 is set to 1 by default on the respective streaming interface; otherwise, either D1 or D2 (but not both) is set to 1 by default. A GET_DEF and GET_CUR request output contains information on all streaming interfaces listed in a GET_MAX request output; however, a SET_CUR request may include a subset of the streaming interfaces listed in GET_MAX request output. The order of the entries returned for a GET_CUR, GET_DEF and GET_MAX may be the same.

An example use case may include a camera that has four video streaming interfaces with numbers 0x03, 0x05, 0x08 and 0x0b, respectively, where video streaming interface 0x05 produces red, green, blue (RGB) data and the remaining three video streaming interfaces produce infrared (IR) data. Among the streaming interfaces that produce IR data, let us assume streaming interfaces 0x03 and 0x0b are both capable of D1, but streaming interface 0x03 is also capable of D0. In this example, the face authentication control is only applicable to the streaming interfaces numbered 0x03 and 0x0b and hence only these interfaces will appear in the requests.

The output for the GET_MAX request may include the following:

| Offset | Field | Size | Value |
|---|---|---|---|
| 0 | bNumEntries | 1 | 0x02 |
| 1 | bInterfaceNumber(1) | 1 | 0x03 |
| 2 | bmControlFlags(1) | 7 | 0x03 (D0 and D1) |
| 9 | bInterfaceNumber(2) | 1 | 0x0b |
| 10 | bmControlFlags(2) | 7 | 0x02 (D1 only) |

The output for the GET_DEF request may include the following:

| Offset | Field | Size | Value |
|---|---|---|---|
| 0 | bNumEntries | 1 | 0x02 |
| 1 | bInterfaceNumber(1) | 1 | 0x03 |
| 2 | bmControlFlags(1) | 7 | 0x01 (D0 is default) |
| 9 | bInterfaceNumber(2) | 1 | 0x0b |
| 10 | bmControlFlags(2) | 7 | 0x02 (D1 is default) |

A SET_CUR request to change the setting on streaming interface 0x03 to D1 may include the following:

| Offset | Field | Size | Value |
|---|---|---|---|
| 0 | bNumEntries | 1 | 0x01 |
| 1 | bInterfaceNumber(1) | 1 | 0x03 |
| 2 | bmControlFlags(1) | 7 | 0x02 |

The output for a GET_CUR request after the above SET_CUR request may include the following:

| Offset | Field | Size | Value |
|---|---|---|---|
| 0 | bNumEntries | 1 | 0x02 |
| 1 | bInterfaceNumber(1) | 1 | 0x03 |
| 2 | bmControlFlags(1) | 7 | 0x02 |
| 9 | bInterfaceNumber(2) | 1 | 0x0b |
| 10 | bmControlFlags(2) | 7 | 0x02 |

Another implementation may include a control selector 28 for a camera extrinsics control. Camera extrinsics control may allow applications 22 to obtain the camera extrinsics data for different capture-types (e.g., video capture and/or still-image capture) on video streaming interfaces associated with a video control interface. The data obtained for each capture-type may show up in Media Foundation as attribute MFStreamExtension_CameraExtrinsics on the attribute store for the corresponding IMF stream which may be obtained using the following call IMFDeviceTransform::GetOutputStreamAttributes. An example implementation of a format of value 40 in data stream 14 for camera extrinsics control is illustrated in the below table.

| Control Selector | MSXU_CONTROL_CAMERA_EXTRINSICS |
|---|---|
| Mandatory Requests | GET_INFO, GET_LEN, GET_RES, GET_MIN, GET_MAX, GET_DEF, GET_CUR |
| wLength | Vendor-specific |

| Offset | Field | Size | Value | Description |
|---|---|---|---|---|
| 0 | bNumEntries | 1 | Number | Number of entries listed: n |
| 1 | bInterfaceNumber(1) | 1 | Number | Video Streaming Interface number for entry 1. A zero-based value identifying the index in the array of concurrent interfaces supported by this configuration. |
| 2 | bCaptureType(1) | 1 | Number | CaptureType for entry 1<br>0: Video; This type is used for data corresponding to video capture (and hence also applies to Method 1 still image capture).<br>1: Still Image; This type is used for data corresponding to Method 2/Method 3 still image capture.<br>2-255: Reserved |
| 3 | wSize(1) | 2 | Number | Size of bData(1) field in bytes: p(1) |
| 5 | bData(1) | p(1) | | Byte array containing camera extrinsics data. The byte array should align to a MFCameraExtrinsics structure followed by zero or more MFCameraExtrinsic_CalibratedTransform structures. |
| ... | ... | ... | ... | ... |
| x | bInterfaceNumber(n) | 1 | Number | Video Streaming Interface number for entry n |
| X + 1 | bCaptureType(n) | 1 | Number | CaptureType for entry n |
| x + 2 | wSize(n) | 2 | Number | Size of bData(n) field in bytes: p(n) |
| x + 4 | bData(n) | p(n) | | Same as that of bData(1) |

Example mandatory requests for camera extrinsics control may include GET_RES, GET_MIN, GET_MAX, and GET_CUR requests that report field bNumEntries set to 0 and hence have no additional fields. In addition, a GET_DEF request lists combinations of streaming interfaces and capture-types that have the extrinsics information available.

Another implementation may include a control selector 28 for a camera intrinsics control. Camera intrinsics control allows applications 22 to obtain the camera intrinsics data for different capture-types (e.g., video capture and/or still-image capture) on video streaming interfaces associated with a video control interface. The data obtained for each capture-type may show up in Media Foundation as attribute MFStreamExtension_PinholeCameraIntrinsics on the attribute store for the corresponding IMF stream (obtained using IMFDeviceTransform::GetOutputStreamAttributes call). An example implementation of a format of value 40 in data stream 14 for camera intrinsics control is illustrated in the below table.

| | | | | |
|---|---|---|---|---|
| Control Selector | MSXU_CONTROL_CAMERA_INTRINSICS | | | |
| Mandatory Requests | GET_INFO, GET_LEN, GET_RES, GET_MIN, GET_MAX, GET_DEF, GET_CUR | | | |
| wLength | Vendor-specific | | | |

| Offset | Field | Size | Value | Description |
|---|---|---|---|---|
| 0 | bNumEntries | 1 | Number | Number of entries listed: n |
| 1 | bInterfaceNumber(1) | 1 | Number | Video Streaming Interface number for entry 1. A zero-based value identifying the index in the array of concurrent interfaces supported by this configuration. |
| 2 | bCaptureType(1) | 1 | Number | CaptureType for entry 1<br>0: Video; This type is used for data corresponding to video capture (and hence also applies to Method 1 still image capture).<br>1: Still Image; This type is used for data corresponding to Method 2/Method 3 still image capture.<br>2-255: Reserved |
| 3 | wSize(1) | 2 | Number | Size of bData(1) field in bytes: p(1) |
| 5 | bData(1) | p(1) | | Byte array containing camera intrinsics data. The byte array should align to a MFPinholeCameraIntrinsics structure followed by zero or more MFPinholeCameraIntrinsic_IntrinsicModel structures. |
| ... | ... | ... | ... | ... |
| x | bInterfaceNumber(n) | 1 | Number | Video Streaming Interface number for entry n |
| X + 1 | bCaptureType(n) | 1 | Number | CaptureType for entry n |
| x + 2 | wSize(n) | 2 | Number | Size of bData(n) field in bytes: p(n) |
| x + 4 | bData(n) | p(n) | | Same as that of bData(1) |

Example mandatory requests for camera intrinsics control may include GET_RES, GET_MIN, GET_MAX, and GET_CUR requests that report field bNumEntries set to 0 and hence have no additional fields. In addition, a GET_DEF request lists all combinations of streaming interface and capture-type that have the intrinsics information available.

Another implementation may include a control selector 28 for a metadata control. Metadata control may allow applications 22 to query and control metadata produced by imaging device 106. Metadata control may be a global control that affects all endpoints on all video streaming interfaces associated with a video control interface. In addition, metadata control may be mapped by the camera driver 14 to KSPROPERTY_CAMERACONTROL_EXTENDED_METADATA. An example implementation of a format of value 40 in data stream 14 for metadata control is illustrated in the below table.

| | | | | |
|---|---|---|---|---|
| Control Selector | MSXU_CONTROL_METADATA | | | |
| Mandatory Requests | GET_INFO, GET_LEN, GET_RES, GET_MIN, GET_MAX, GET_DEF, GET_CUR | | | |
| Optional Requests | SET_CUR | | | |
| wLength | 4 | | | |

| Offset | Field | Size | Value | Description |
|---|---|---|---|---|
| 0 | dwValue | 4 | Number | Metadata size in units of KBs for each frame. |

When a SET_CUR request is supported by the firmware, the GET_MIN, GET_DEF requests may report field dwValue set to 0. In addition, the GET_RES request may report field dwValue to be the same value as reported by GET_MAX request. When a SET_CUR request is received with dwValue set to 0, metadata may not be produced by the imaging device. When a SET_CUR request is received with dwValue set to be the same value as reported by GET_MAX request, the imaging device may produce metadata and the size of such metadata may not exceed dwValue for any frame.

When a SET_CUR request is not supported by the firmware, the GET_MIN and GET_DEF requests may report field dwValue to be the same value as reported by GET_MAX request. In addition, the GET_RES request may report field dwValue set to 0. The imaging device may be able to produce metadata and the size of such metadata may not exceed the dwValue, reported by GET_MAX request, for any frame. The format of the metadata is discussed in further detail below.

In an implementation, Method 2 still image capture capability may be discovered through a setup information (INF) file. There have been reports that existing USB video class ("UVC") devices do not reliably support the Method 2 still image capture described in section 2.4.2.4 (titled "Still Image Capture") of the document "UVC 1.5 Class specification.pdf." For example, in solutions prior to this disclosure, the Media Foundation capture pipeline did not leverage Method 2 even if a device advertised support for it per the UVC 1.5 specification.

According to this disclosure, devices that desire to leverage Method 2 can use a custom setup information file, such as a INF file, for the camera driver (note: the camera driver can be based on the Windows USBVIDEO.SYS or can be based on a custom driver binary, and a custom INF is used for the given hardware to enable Method 2 still image capture). In another implementation, this information may be queryable or discoverable from the device through other means.

The custom INF file (based on either custom UVC driver or inbox UVC driver) includes the following AddReg entry: EnableDependentStillPinCapture: REG_DWORD: 0x0 (Disabled) to 0x1 (Enabled)

When this entry is set to Enabled (0x1), the capture pipeline leverages Method 2 for Still Image Capture (assuming the firmware also advertises support for Method 2 as specified by UVC 1.5 specification).

Referring back to FIG. 1, driver 10 may also include a metadata component 16 that may generate a metadata buffer 18 with metadata for image data 25 and/or imaging device 106. Metadata component 16 may create well-defined entries for metadata items. In addition, metadata data may be on a per frame basis. For example, driver 10 may transmit metadata buffer 18 to image API 20 so that application 22 may receive image data 25 along with any additional metadata information provided by metadata buffer 18. Application 22 may use the metadata information, for example, in processing image data 25.

Figure 3:
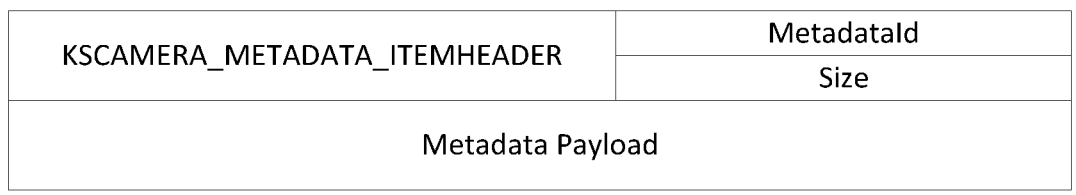
FIG. 3 is an example metadata format in accordance with an implementation of the present disclosure.

In an example implementation of this disclosure, driver 10 can be a camera driver that can signal support for standard-format metadata by implementing the metadata control discussed above. FIG. 3 illustrates one implementation of standard-format metadata 300. Standard-format metadata 300 may include the following structure:

```
typedef struct tagKSCAMERA_METADATA_ITEMHEADER {
    ULONG    MetadataId;
    ULONG    Size;    // Size of this header + metadata
                         payload following
} KSCAMERA_METADATA_ITEMHEADER,
*PKSCAMERA_METADATA_ITEMHEADER;
```

The MetadataId field may be filled by an identifier from the following enumeration definition, which contains well-defined identifiers, as well as custom identifiers (identifiers>=MetadataId_Custom_Start).

```
typedef enum {
    MetadataId_Standard_Start = 1,
    MetadataId_PhotoConfirmation = MetadataId_Standard_Start,
    MetadataId_UsbVideoHeader,
    MetadataId_CaptureStats,
    MetadataId_CameraExtrinsics,
    MetadataId_CameraIntrinsics,
    MetadataId_FrameIllumination,
    MetadataId_Standard_End = MetadataId_FrameIllumination,
    MetadataId_Custom_Start = 0x80000000,
} KSCAMERA_MetadataId;
```

In addition, the Size field is set to: sizeof(KSCAMERA_METADATA_ITEMHEADER)+sizeof(Metadata Payload).

One implementation may include firmware-generated standard-format metadata from USB video frame packets. During a transfer over UVC for frame based video, the video frame is packetized into a series of packets, each preceded by a UVC Payload Header. Each UVC Payload Header is defined by the USB Video Class Driver Frame Based Payload specification. An example implementation of the payload header format for Frame Based formats is illustrated in the table below.

| HLE (Header Length) | | | | | | | |
|---|---|---|---|---|---|---|---|
| EOH | ERR | STI | RES | SCR | PTS | EOF | FID |
| PTS [7:0] | | | | | | | |
| PTS [15:8] | | | | | | | |
| PTS [23:16] | | | | | | | |
| PTS [31:24] | | | | | | | |
| SCR [7:0] | | | | | | | |
| SCR [15:8] | | | | | | | |

| HLE (Header Length) | | | | | | | |
|---|---|---|---|---|---|---|---|
| EOH | ERR | STI | RES | SCR | PTS | EOF | FID |
| SCR [23:16] | | | | | | | |
| SCR [31:24] | | | | | | | |
| SCR [39:32] | | | | | | | |
| SCR [47:40] | | | | | | | |

The Header Length (HLE) field specifies the length of the header, in bytes. The Frame Identifier (FID) bit toggles at each frame start boundary and stays constant for the rest of the frame. The End of Frame (EOF) bit indicates the end of a video frame and is set in the last video sample belonging to a frame. The use of the EOF bit is optional and may be used as an optimization to reduce latency in completion of a frame transfer. The Presentation Time Stamp (PTS) bit, when set, indicates the presence of a PTS field. The Source Clock Reference (SCR) bit, when set, indicates the presence of a SCR field. In addition, the Reserved (RES) bit is set to 0.

The Still Image (STI) bit, when set, identifies a video sample as belonging to a still image. In addition, the Error (ERR) bit, when set, indicates an error in the device streaming. The End of Header (EOH) bit, when set, indicates the end of the BFH fields. The PTS field, of size 4 bytes, is present when the PTS bit is set in the BFH[0] field and is described in Section 2.4.3.3 "Video and Still Image Payload Headers" in the USB Device Class Definition for Video Devices specification. The SCR field, of size 6 bytes, is present when the SCR bit is set in the BFH[0] field and is described in Section 2.4.3.3 "Video and Still Image Payload Headers" in the USB Device Class Definition for Video Devices specification.

The HLE field is fixed to either 2 bytes (no PTS/SCR present) or up to 12 bytes (PTS/SCR present). However, the HLE field, being a byte sized field, can potentially specify up to 255 bytes of header data. If both PTS/SCR are present, and the HLE is >12 bytes, any additional data following the first 12 bytes of the payload header is picked up as standard metadata specific to the video frame when the firmware implements MSXU_CONTROL_METADATA control.

Figure 4:
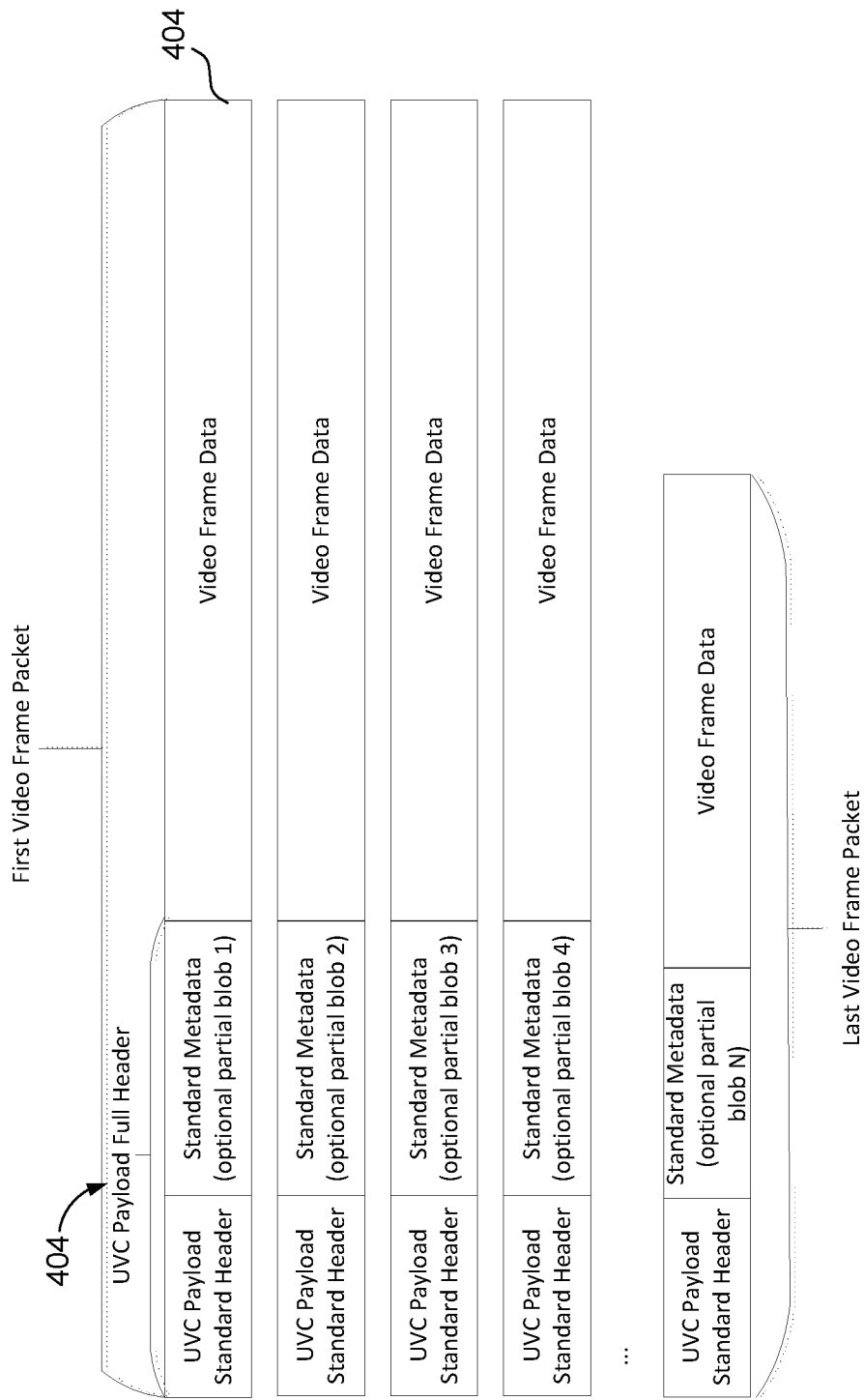
FIG. 4 is an example of video frame packets received from an imaging device in accordance with an implementation of the present disclosure.

The standard-format metadata (generated by, for example, firmware) for a frame is obtained by concatenating the partial blobs found in the Video Frame Packets representing that frame, as illustrated in FIG. 4.

Figure 5:
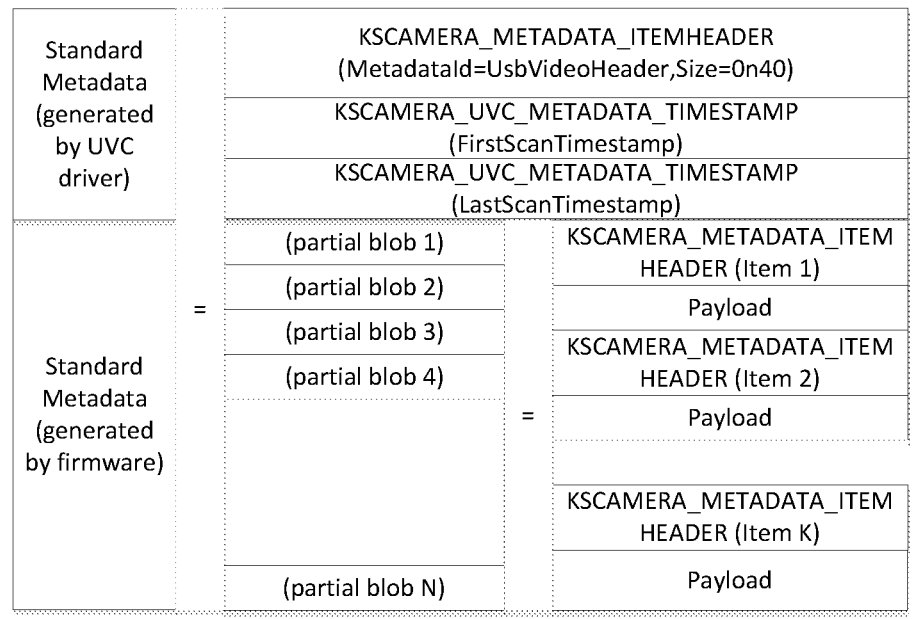
FIG. 5 is an example metadata buffer in accordance with an implementation of the present disclosure.

Referring now to FIG. 5, illustrated therein is an example metadata buffer 18. Metadata buffer 18 may be provided to the user mode component and may include a metadata item for the UVC timestamps (generated by UVC driver) followed by firmware-generated metadata items.

In an implementation, metadata format for standard metadata identifiers may include the firmware choosing whether or not to produce metadata corresponding to an identifier. If the firmware chooses to produce metadata corresponding to an identifier, the metadata shall be present on all frames emitted by the firmware.

In an implementation, the defined format of each type of metadata includes one or more information fields, and a corresponding one or more flags indicating whether or not data is included in the corresponding one or more information fields. In addition, the metadata information may be in an initial indication depending on whether a stream supports metadata and/or on a per frame basis (e.g., a frame-by-frame update).

In an implementation, the metadata format for the META-DATAID_CAPTURESTATS identifier is defined by the following structure:

```
typedef struct tagKSCAMERA_METADATA_CAPTURESTATS {
    KSCAMERA_METADATA_ITEMHEADER  Header;
    ULONG       Flags;
    ULONG       Reserved;
    ULONGLONG   ExposureTime;
    ULONGLONG   Exposure-
                CompensationFlags;
    LONG        ExposureCom-
                pensationValue;
    ULONG       IsoSpeed;
    ULONG       FocusState;
    ULONG       LensPosition;
                // a.k.a Focus
    ULONG       WhiteBalance;
    ULONG       Flash;
    ULONG       FlashPower;
    ULONG       ZoomFactor;
    ULONGLONG   SceneMode;
    ULONGLONG   SensorFramerate;
}KSCAMERA_METADATA_CAPTURESTATS,
*PKSCAMERA_METADATA_CAPTURESTATS;
```

The Flags field indicates which of the later fields in the structure are filled and have valid data. In one example, the Flags field does not vary from frame to frame. In one implementation, the following flags are defined:

```
#define KSCAMERA_METADATA_CAPTURESTATS_FLAG_EXPOSURETIME          0x00000001
#define KSCAMERA_METADATA_CAPTURESTATS_FLAG_EXPOSURECOMPENSATION  0x00000002
#define KSCAMERA_METADATA_CAPTURESTATS_FLAG_ISOSPEED              0x00000004
#define KSCAMERA_METADATA_CAPTURESTATS_FLAG_FOCUSSTATE            0x00000008
#define KSCAMERA_METADATA_CAPTURESTATS_FLAG_LENSPOSITION          0x00000010
#define KSCAMERA_METADATA_CAPTURESTATS_FLAG_WHITEBALANCE          0x00000020
#define KSCAMERA_METADATA_CAPTURESTATS_FLAG_FLASH                 0x00000040
#define KSCAMERA_METADATA_CAPTURESTATS_FLAG_FLASHPOWER            0x00000080
#define KSCAMERA_METADATA_CAPTURESTATS_FLAG_ZOOMFACTOR            0x00000100
#define KSCAMERA_METADATA_CAPTURESTATS_FLAG_SCENEMODE             0x00000200
#define KSCAMERA_METADATA_CAPTURESTATS_FLAG_SENSORFRAMERATE       0x00000400
```

The Reserved field is reserved for future and is set to 0.

The ExposureTime field contains the exposure time, in 100 ns intervals, applied to the sensor when the frame was captured and will show up as attribute MF_CAPTURE_METADATA_EXPOSURE_TIME on the corresponding MF sample.

The ExposureCompensationFlags field contains the EV compensation step (exactly one of the KSCAMERA_EXTENDEDPROP_EVCOMP_XXX step flags is set) used to convey the EV Compensation value. The ExposureCompensationValue field contains the EV Compensation value in units of the step applied to the sensor when the frame was captured and will show up as attribute MF_CAPTURE_METADATA_EXPOSURE_COMPENSATION on the corresponding MF sample.

The IsoSpeed field contains the ISO speed value applied to the sensor when the frame was captured and is unitless. The IsoSpeed field will show up as attribute MF_CAPTURE_METADATA_ISO_SPEED on the corresponding MF sample.

The FocusState field contains the current focus state which can take one of the values defined in enum KSCAMERA_EXTENDEDPROP_FOCUSSTATE and will show up as attribute MF_CAPTURE_METADATA_FOCUSSTATE on the corresponding MF sample.

The LensPosition field contains the logical lens position when the frame was captured, which is unitless. The lens position is the same value that can be queried from KSPROPERTY_CAMERACONTROL_EXTENDED_FOCUS in a GET call and will show up as attribute MF_CAPTURE_METADATA_LENS_POSITION on the corresponding MF sample.

The WhiteBalance field contains the white balance applied to the sensor when the frame was captured, which is a value in Kelvin and will show up as attribute MF_CAPTURE_METADATA_WHITEBALANCE on the corresponding MF sample.

The Flash field contains a boolean value with 1 meaning flash on, and 0 meaning flash off, when frame was captured and will show up as attribute MF_CAPTURE_METADATA_FLASH on the corresponding MF sample.

The FlashPower field contains the flash power applied to the frame captured which is a value in the range of [0, 100]. FlashPower field is omitted if the driver does not support adjustable power for flash and will show up as attribute MF_CAPTURE_METADATA_FLASH_POWER on the corresponding MF sample.

The ZoomFactor field contains the zoom value in Q16 format applied to the frame captured and will show up as attribute MF_CAPTURE_METADATA_ZOOMFACTOR on the corresponding MF sample.

The SceneMode field contains the scene mode applied to the frame captured which is a 64 bit KSCAMERA_EXTENDEDPROP_SCENEMODE_XXX flag and will show up as attribute MF_CAPTURE_METADATA_SCENE_MODE on the corresponding MF sample.

The SensorFramerate field contains the measured sensor readout rate in hertz when the frame is captured, which consists of a numerator value in the upper 32 bit and a denominator value in the lower 32 bit and will show up as attribute MF_CAPTURE_METADATA_SENSORFRAMERATE on the corresponding MF sampleTA_SCENE_MODE on the corresponding MF sample.

The metadata format for the METADATAID_CAMERAEXTRINSICS identifier involves the standard KSCAMERA_METADATA_ITEMHEADER followed by a byte-array payload. The payload aligns to a MFCameraExtrinsics structure followed by zero or more MFCameraExtrinsic_CalibratedTransform structures. The payload is 8-byte aligned and all unused bytes shall occur at the end of the payload and be set to 0.

The metadata format for the METADATAID_CAMERAINTRINSICS identifier involves the standard KSCAMERA_METADATA_ITEMHEADER followed by a byte-array payload. The payload aligns to a MFPinholeCameraIntrinsics structure. In addition, the payload is 8-byte aligned and all unused bytes shall occur at the end of the payload and be set to 0.

The metadata format for MetadataId_FrameIllumination identifier is defined by the following structure:

```
typedef
struct tagKSCAMERA_METADATA_FRAMEILLUMINATION {
    KSCAMERA_METADATA_ITEMHEADER    Header;
    ULONG                           Flags;
    ULONG                           Reserved;
}KSCAMERA_METADATA_FRAMEILLUMINATION,
*PKSCAMERA_METADATA_FRAMEILLUMINATION;
```

The Flags field indicates information about the captured frame. Currently, the following flags are defined:
define KSCAMERA_METADATA_FRAMEILLUMINA-TION_FLAG_ON 0x00000001
If a frame was captured when illumination was on, the flag KSCAMERA_METADATA_FRAMEILLUMINATION_FLAG_ON is set. Otherwise, this flag is not set. The Reserved field is reserved for future and shall be set to 0.

Referring back to FIG. 1, application 22 may query image API 20 for image data 25 and/or imaging device 106 information. Image API 20 may communicate with driver 10 and may receive data stream 14 and/or metadata buffer 18 in response to the query received from application 22.

Figure 6:
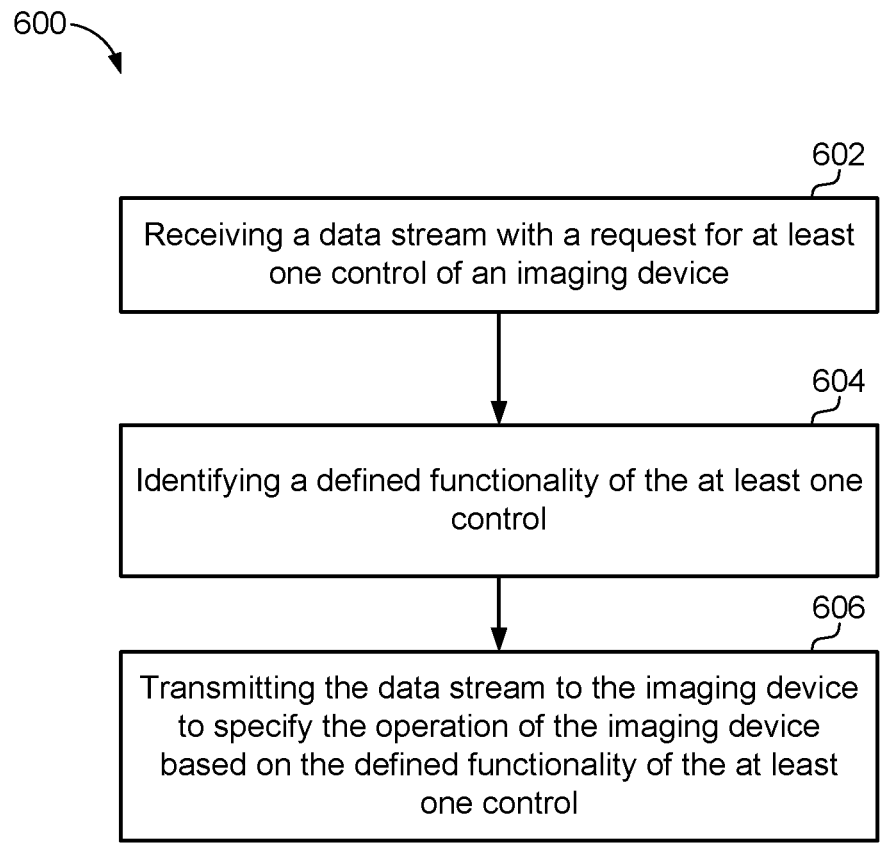
FIG. 6 is a flow chart of a method for enabling one or more controls for an imaging device in accordance with an implementation of the present disclosure.

Referring now to FIG. 6, an example method 600 for enabling one or more controls for an imaging device may be executed by, for example, the operating system 110 (FIG. 1) on computer device 102 (FIG. 1). At 602, method 600 may include receiving a data stream with a request for at least one control of an imaging device. For example, in one implementation, application 22 may send a communication to image API 20 with one or more controls specified for imaging device 106 (FIG. 1). The one or more controls may be related to Universal Serial Bus (USB) video. In addition, the one or more controls may include, but are not limited to, focus control, exposure control, EV compensation control, white balance control, face authentication control, camera extrinsics control, camera intrinsics control, cancelable controls, ISO control, and metadata control. Additionally, one or more of the controls may include a lock mode associated with one or more control functions.

At 604, method 600 may include identifying a defined functionality of the at least one control. The data stream may have a defined set of fields and/or data associated with the respective one or more controls that are to be enabled. For instance, the set of fields may include one or more of a control selector field, a mandatory request field, a length field, an offset field, a size field, a value field, and a description field. For example, application 22 may want to specify a lock mode focus setting for imaging device 106 (FIG. 1). Application 22 may send a communication to image API 20 indicating that application 22 wants a lock mode focus setting for imaging device 106. Control definition component 12 may generate data stream 14 by selecting the appropriate control selector and selecting the appropriate control flags or control data to indicate that the focus of imaging device 106 is in a lock mode based on the formatting described above. Example functionality for the different controls are illustrated in the tables discussed in reference to FIGS. 1 and 2.

At 606, method 600 may include transmitting the data stream to an imaging device to specify the operation of the imaging device based on the defined functionality of the at least one control. For example, in one implementation, driver 10 may transmit data stream 14 with the appropriate controls selected to imaging device 106. For example, if data stream 14 selected the controls for lock mode focus, imaging device 106 is expected to lock the current focus state and keep the current focus locked until a new focus command is received. As such, imaging device 106 and computer device 102 may use the defined functionality of the controls to communicate with each other and perform the requested operations.

Figure 7:
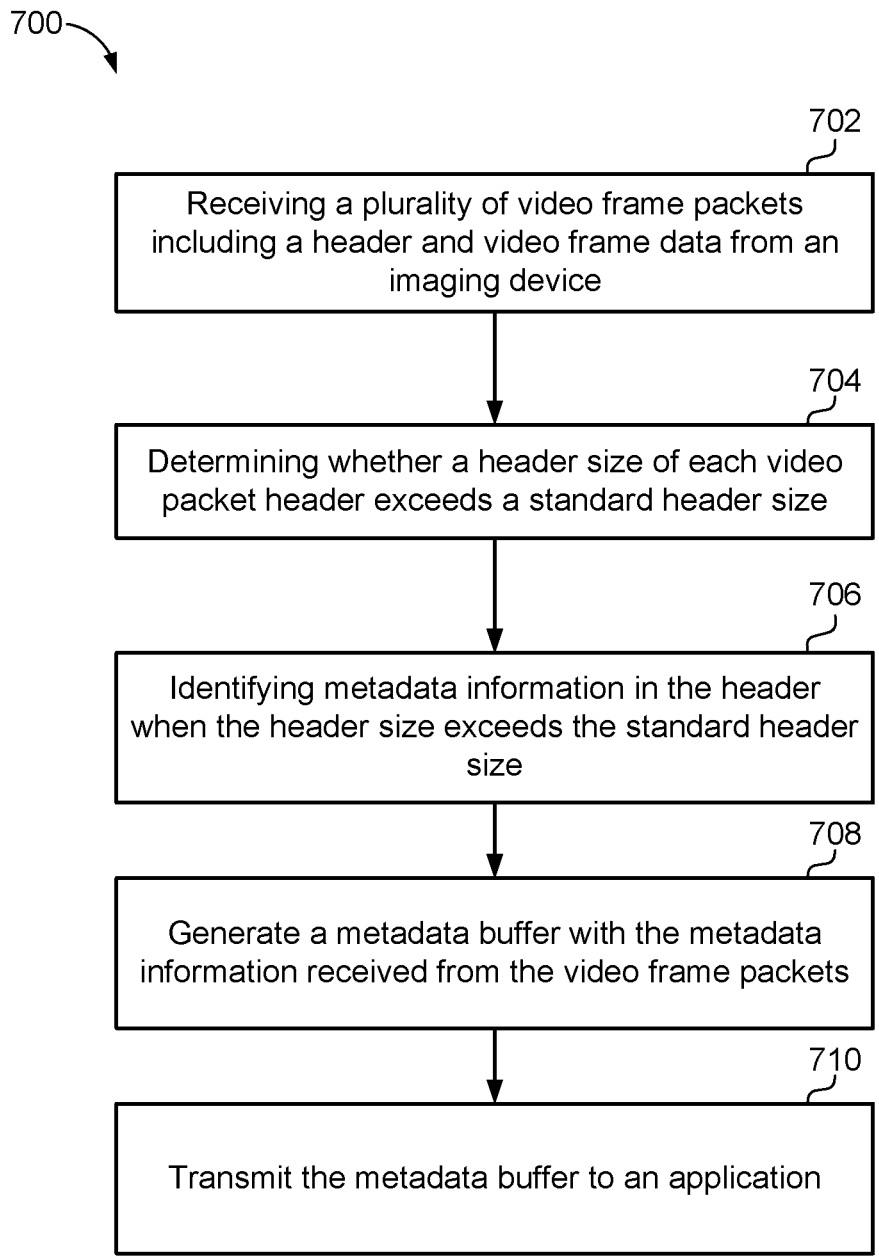
FIG. 7 is a flow chart of a method for generating a metadata buffer in accordance with an implementation of the present disclosure.

Referring now to FIG. 7, an example method 700 for generating metadata information may be executed by, for example, an operating system 110 (FIG. 1) on computer device 102 (FIG. 1). At 702, method 700 may include receiving a plurality of video frame packets including a header and video frame data from an imaging device. For example, driver 10 (FIG. 1) may receive a plurality of video frame packets from imaging device 106 (FIG. 1). Video frame packets may also include packets and/or transfers received from imaging device 106. Each video frame packet may include a header 402 and may include video frame data 404, as illustrated, for example, in FIG. 4.

At 704, method 700 may include determining whether a header size of each video frame packet header exceeds a standard header size. The standard header size may be fixed either at 2 bytes (e.g., if the PTS and SCR fields are not present in the header) or up to 12 bytes (e.g., if the PTS and/or SCR fields are present in the header). Driver 10 may determine, for each video frame packet received, whether the header size exceeds a standard header size. For example, if both the PTS and SCR fields are present and the header size exceeds 12 bytes, driver 10 may determine that the header size of the video frame packet received exceeds the standard header size. Another example may include, if the PTS field is present and the SCR field is not present and the header size exceeds 6 bytes, driver 10 may determine that the header size of the video frame packet received exceeds the standard header size. Another example may include, if the PTS and SCR fields are not present and the header size is 2 bytes, driver 10 may determine that the header size of the video frame packet received does not exceed the standard header size.

At 706, method 700 may include identifying metadata information in the header when the header size exceeds the standard header size. Driver 10 may identify metadata information in the additional bytes after the standard header size. Metadata information may include, but is not limited to, frame illumination information, camera intrinsic information, camera extrinsics information, and capture stats. Each video frame packet received may have a different header size. As such, each video frame packet received may include a different amount of metadata information. While other video frame packets received may not include any metadata information.

At 708, method 700 may include generating a metadata buffer with metadata information received from each of the video frame packets. For example, in one implementation, driver 10 may assemble metadata buffer 18 with the identified metadata information in the headers of the received video frame packets in a same order as the video frame packets are received by driver 10. An example metadata buffer 18 is illustrated in FIG. 5.

At 710, method 700 may also include transmitting the metadata buffer to an application. For example, in one implementation, application 22 may receive metadata buffer 18 (FIG. 1) from driver 10 when application 22 may need to use frame level information regarding image data 25. For instance, application 22 may be a face authentication application that wants additional information about frame illumination. Metadata buffer 18 may be used to notify application 22 which frame is illuminated and which frame is not illuminated in image data 25.

In another example, application 22 may use the metadata information from metadata buffer 18 for post image processing. For instance, one example may include application 22 combining video streams from a plurality of cameras into a single view. For example, two cameras may be transmitting a real time image and application 22 may want to combine the information from both cameras into a single view. Application 22 may use the extrinsic and intrinsic metadata information to identify a pixel location in the first camera and a corresponding pixel in the second camera to combine the image into a single view.

Another example of application 22 using metadata information may include application 22 using capturestats for post processing. For example, imaging device 106 may pan a scene and application 22 may want to stitch together the images received from imaging device 106. Application 22 may use exposure information and focus information to stitch the received images together so that the pictures look evenly exposed and in focus, even if the exposure and/or focus changed during the pan. For example, a flash may have gone off during the pan and application 22 may use the exposure information provided in metadata buffer 18 to compensate for the flash.

Figure 8:
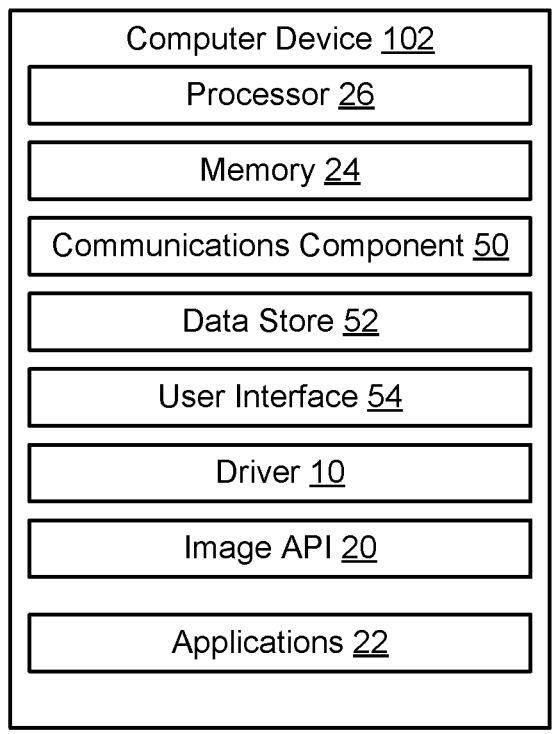
FIG. 8 is a schematic block diagram of an example device in accordance with an implementation of the present disclosure.

Referring now to FIG. 8, illustrated is an example computer device 102 in accordance with an implementation, including additional component details as compared to FIG. 1. In one example, computer device 102 may include processor 26 for carrying out processing functions associated with one or more of components and functions described herein. Processor 26 can include a single or multiple set of processors or multi-core processors. Moreover, processor 26 can be implemented as an integrated processing system and/or a distributed processing system.

Computer device 102 may further include memory 24, such as for storing local versions of applications being executed by processor 26. Memory 24 can include a type of memory usable by a computer, such as random access memory (RAM), read only memory (ROM), tapes, magnetic discs, optical discs, volatile memory, non-volatile memory, and any combination thereof. Additionally, processor 26 and memory 24 may include and execute operating system 110 (FIG. 1).

Further, computer device 102 may include a communications component 50 that provides for establishing and maintaining communications with one or more parties utilizing hardware, software, and services as described herein. Communications component 50 may carry communications between components on computer device 102, as well as between computer device 102 and external devices, such as devices located across a communications network and/or devices serially or locally connected to computer device 102. For example, communications component 50 may include one or more buses, and may further include transmit chain components and receive chain components associated with a transmitter and receiver, respectively, operable for interfacing with external devices.

Additionally, computer device 102 may include a data store 41, which can be any suitable combination of hardware and/or software, that provides for mass storage of information, databases, and programs employed in connection with implementations described herein. For example, data store 52 may be a data repository for driver 10 (FIG. 1), image API 20 (FIG. 1) and/or applications 22 (FIG. 1).

Computer device 102 may also include a user interface component 54 operable to receive inputs from a user of computer device 102 and further operable to generate outputs for presentation to the user. User interface component 54 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 54 may include one or more output devices, including but not limited to a display, a speaker, a haptic feedback mechanism, a printer, any other mechanism capable of presenting an output to a user, or any combination thereof.

Computer device 102 may additionally include driver 10 (FIG. 1) configured to generate data stream 14 (FIG. 1) with new controls defined for image data 25 (FIG. 1) and/or imaging device 106 (FIG. 1). In addition, computer device 102 may include image API 20 (FIG. 1) configured to receive and/or transmit communications between applications 22 (FIG. 1) and driver 10. In an implementation, user interface component 54 may transmit and/or receive messages corresponding to the operation of driver 10, image API 20 and/or applications 22. In addition, processor 26 executes driver 10, image API 20 and/or applications 22, and memory 24 or data store 52 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 102), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions including a setup information (INF) file having a still image capture enabled/disabled value;
   a processor in communication with the memory; and
   an operating system in communication with the memory and the processor, wherein the operating system is operable to:
      receive a data stream with a request for at least one control of a plurality of controls for an imaging device, wherein the at least one control is related to Universal Serial Bus (USB) video and related to still image capture;
      identify a defined functionality of the at least one control including determining whether the imaging device supports still image capture based on the still image capture enabled/disabled value; and
      transmit the data stream to the imaging device to specify an operation of the imaging device based on the defined functionality of the at least one control.

2. The computer device of claim 1, wherein the at least one control comprises a lock mode.

3. The computer device of claim 1, wherein the at least one control comprises a cancelable control.

4. The computer device of claim 1, wherein the operating system is further configured to enable the at least one control by selecting a corresponding field for the at least one control.

5. The computer device of claim 1, wherein the at least one control is identified by comparing the at least one control to a predefined value.

6. The computer device of claim 1, wherein the operating system is further operable to determine whether the imaging device supports Method 2 still image capture based on the still image capture enabled/disabled value of the setup INF file.

7. The computer device of claim 1, wherein the at least one control further includes an exposure control and the defined functionality for the exposure control includes at least one of a lock mode or asynchronous capabilities.

8. The computer device of claim 1, wherein the defined functionality of the at least one control includes asynchronous capabilities.

9. The computer device of claim 1, wherein the defined functionality for exposure compensation control further includes granular steps for exposure compensation.

10. The computer device of claim 1, wherein the operating system is further operable to implement two or more of the plurality of controls together.

11. The computer device of claim 1, wherein the defined functionality further includes a lock mode that maintains a current setting of the at least one control until receiving a change to the current setting.

12. The computer device of claim 1, wherein the defined functionality further includes an ability to cancel or turn off the at least one control.

13. The computer device of claim 1, wherein the at least one control further includes one or more of exposure compensation (EV) control or white balance control and the defined functionality includes a lock mode to lock a current setting until receiving a completion of a status interrupt.

14. The computer device of claim 1, wherein the operating system is further operable to receive the data stream with the request for the at least one control for a plurality of imaging devices in communication with the computer device and the at least one control is a global control that affects all of the plurality of imaging devices.

15. The computer device of claim 1, wherein the at least one control further comprises one or more of focus control, face authentication control, camera extrinsics control, camera intrinsics control, ISO control, or metadata control.

16. A method for enabling controls of an imaging device, comprising:
   receiving a data stream with a request for at least one control of a plurality of controls for the imaging device, wherein the at least one control is related to Universal Serial Bus (USB) video and related to still image capture;
   identifying a defined functionality of the at least one control including determining whether the imaging device supports still image capture based on a still image capture enabled/disabled value included in a setup information (INF) file; and
   transmitting the data stream to the imaging device to specify an operation of the imaging device based on the defined functionality of the at least one control.

17. The method of claim 16, wherein the at least one control comprises a lock mode.

18. The method of claim 16, wherein the at least one control comprises a cancelable control.

19. The method of claim 16, wherein the at least one control is enabled by selecting a corresponding field for the at least one control.

20. The method of claim 16, wherein the at least one control is identified by comparing the at least one control to a predefined value.

21. The method of claim 16, further comprising determining whether the imaging device supports Method 2 still image capture based on the still image capture enabled/disabled value of the setup INF file.

22. The method of claim 16, wherein the at least one control further comprises one or more of focus control, face authentication control, camera extrinsics control, camera intrinsics control, ISO control, or metadata control.

23. A non-transitory computer-readable medium storing instructions executable by a computer device, comprising:
   at least one instruction for causing the computer device to receive a data stream with a request for at least one control of a plurality of controls for an imaging device, wherein the at least one control is related to Universal Serial Bus (USB) video and related to still image capture;
   at least one instruction for causing the computer device to identify a defined functionality of the at least one control including to determine whether the imaging device supports still image capture based on a still image capture enabled/disabled value included in a setup information (INF) file; and
   at least one instruction for causing the computer device to transmit the data stream to the imaging device to specify an operation of the imaging device based on the defined functionality of the at least one control.

* * * * *